United States Patent [19]

Castetter

[11] Patent Number: 5,129,619

[45] Date of Patent: Jul. 14, 1992

[54] SEALED MAGNETICALLY OPERATED FLOW CONTROL VALVE ASSEMBLY

[75] Inventor: Forrest Castetter, Noblesville, Ind.

[73] Assignee: Retro-Tech Corporation, Indianapolis, Ind.

[21] Appl. No.: 498,837

[22] Filed: Mar. 26, 1990

[51] Int. Cl.$^5$ .................... F16K 31/08; F16K 31/126
[52] U.S. Cl. ........................ 251/65; 137/486; 137/487.5; 137/497; 251/61.4; 251/129.11; 335/255; 335/260; 335/302
[58] Field of Search .............. 251/65, 61, 62, 61.3, 251/61.4, 61.5, 129.03, 129.08, 129.15, 129.11; 137/484.2, 497, 485, 486, 487.5; 335/255, 260, 302

[56] References Cited

U.S. PATENT DOCUMENTS

| | | | |
|---|---|---|---|
| 2,533,491 | 12/1950 | McMahon et al. | 251/65 |
| 2,536,813 | 1/1951 | Jones et al. | 251/65 |
| 2,629,401 | 2/1953 | Miller | 251/65 |
| 2,644,477 | 7/1953 | King | 251/65 |
| 2,692,113 | 10/1954 | Larkin, Jr. | 251/129.03 |
| 2,863,287 | 12/1958 | Berkman | 137/487.5 |
| 2,870,387 | 1/1959 | Brand et al. | 137/487.5 |
| 2,942,837 | 6/1960 | Bauerlein | 251/65 |
| 2,965,117 | 12/1960 | Gallacher | 251/65 |
| 3,021,866 | 2/1962 | Handley | 251/65 |
| 3,212,751 | 10/1965 | Hassa | 251/65 |
| 3,275,011 | 9/1966 | Berezansky et al. | 251/65 |
| 3,464,438 | 9/1969 | Maurer | 137/487.5 |
| 3,637,187 | 1/1972 | Burger | 251/61.3 |
| 4,039,139 | 8/1977 | Bird | 251/65 |
| 4,274,444 | 6/1981 | Ruyak | 251/65 |
| 4,284,262 | 8/1981 | Ruyak | 251/65 |
| 4,296,912 | 10/1981 | Ruyak | 251/65 |
| 4,417,312 | 11/1983 | Cronin et al. | 137/487.5 |
| 4,496,134 | 1/1985 | Idogaski et al. | 251/65 |
| 4,967,789 | 11/1990 | Kypris | 251/65 |

FOREIGN PATENT DOCUMENTS

| | | | |
|---|---|---|---|
| 0036607 | 3/1980 | Japan | 251/65 |
| 0127177 | 8/1982 | Japan | 127/497 |

Primary Examiner—George L. Walton
Attorney, Agent, or Firm—Woodard, Emhardt, Naughton, Moriarty & McNett

[57] ABSTRACT

A sealed control valve assembly is provided for use in connection with a fluid valve having an inlet, an outlet and a flow control orifice hydraulically interposed therebetween for controlling the flow through the fluid valve. The valve assembly includes a sealed cylindrical isolator cap sealingly mounted to the fluid valve so that the chamber defined by the isolator cap is in hydraulic communication with the fluid valve. In one embodiment, an armature composed of a magnetic material is reciprocatably disposed within the isolator cap. A modulating plug is connected to a lower end of the armature to extend outside the isolator cap into the fluid valve adjacent the flow control orifice. A magnetic pole piece assembly, including a magnet sandwiched between a pair of pole pieces, is reciprocatably disposed outside and adjacent to the isolator cap. A diaphragm assembly is provided to move the pole piece assembly down in response to fluid pressure exerted against the diaphragm. The pressure against the diaphragm can be varied in relation to a condition of the fluid flowing through the fluid valve. The pole piece assembly and the armature form a magnetic circuit so that the armature follows the movement of the pole piece assembly in order to maintain the continuity of the magnetic circuit. The modulating plug moves with the armature to modulate the fluid flowing through the flow control orifice in the fluid valve. A biasing spring may be provided to react against the downward action of the diaphragm and provide a return stroke for the pole piece assembly and armature.

14 Claims, 7 Drawing Sheets

SEALED MAGNETICALLY OPERATED FLOW CONTROL VALVE ASSEMBLY

BACKGROUND OF THE INVENTION

The present invention relates to magnetically operated valves, such as fluid control valves. In particular, the invention concerns a fluid-tight flow control valve which includes a valve stem sealed within a valve housing that is magnetically actuated.

Magnetically operated fluid valves are known in the prior art which include an actuator movable between an on position and an off position in response to a magnetic field. For example, the patent to Halgreen, U.S. Pat. No. 3,326,511, discloses an electro magnetically actuated valve in which an armature is affixed to a valve stem. When an electric coil is activated, the magnetic flux causes the valve to move between an open and closed position. The Halgreen patent also shows a sealed cylinder in which the magnetic actuator and valve stem reciprocates in response to the generator magnetic field.

The patent to Cummings et al., U.S. Pat. No. 4,779,640, discloses a magnetically operated automatic drain valve. In the Cummings device, a float carries a permanent magnet that surrounds a closed valve housing. The pilot actuator reciprocates within that closed valve housing in response to the position of the permanent magnet relative to the pilot valve plug. Again, the Cummins et al. patent discloses an on-off type device.

The patent to Parodi et al., U.S. Pat. No. 3,666,231, discloses an electro magnetic valve which includes at least three windings which can be selectively excited. The selective excitation of the windings causes the valve to move between on and off positions depending upon which coils have been excited. Richeson, Jr., U.S. Pat. No. 4,831,973, discloses a similar valve that uses electromagnetic repulsion to move an armature. Bosley et al., U.S. Pat. No. 4,690,371, shows an electromagnetic valve with a permanent magnet armature. The valve opens or closes depending upon the electromagnet coil polarity.

Staefa Control System, Inc. of San Diego, Calif. manufactures a three-way modulating valve that uses an electromagnet oil to shuttle a valve disc between two positions to selectively connect one of two inputs to the output.

There is a need to provide a sealed valve assembly which can operate in response to a sensed condition. For instance, a flow control valve must vary the amount of fluid passing through a pipe in response to a fluid flow rate sensed down stream from the valve. The valve must be fluid tight so that the actuating member is free to reciprocate without risk of fluid leakage. There is also a need for a sealed valve that can be actuated in step-wise or continuously variable fashion, rather than simply an on-off manner.

SUMMARY OF THE INVENTION

In view of the limitations of the prior art devices and of the needs in the industry, the present invention provides a sealed control valve assembly for use in connection with a fluid valve having an inlet, an outlet and a flow control orifice hydraulically interposed therebetween for controlling the flow through the fluid valve. The valve assembly includes a sealed cylindrical isolator cap sealingly mounted to the fluid valve so that the chamber defined by the isolator cap is in hydraulic communication with the fluid valve. In one embodiment, an armature composed of a magnetic material is reciprocatably disposed within the isolator cap. A modulating plug is connected to a lower end of the armature to extend outside the isolator cap into the fluid valve adjacent the flow control orifice. A magnetic pole piece assembly, including a magnet sandwiched between a pair of pole pieces, is reciprocatably disposed outside and adjacent to the isolator cap. A diaphragm assembly is provided to push the pole piece assembly down in response to fluid pressure exerted against the diaphragm. The pressure against the diaphragm is varied in relation to a condition of the fluid flowing through the fluid valve.

The pole piece assembly and the armature form a magnetic circuit so that the armature follows the movement of the pole piece assembly in order to maintain the continuity of the magnetic circuit. That is, when the diaphragm flexes, the pole piece assembly moves downward toward the fluid valve. The armature moves downward within the isolator cap in direct relation to the movement of the pole piece assembly. As the armature moves downward, it moves the modulator plug into the flow control orifice, thereby controlling the flow of fluid through the fluid valve. A biasing spring may be provided to react against the downward action of the diaphragm and provide a return stroke for the pole piece assembly and armature.

In another embodiment, a rotary control valve assembly is provided for controlling a ball valve in a fluid valve. In this embodiment, the pole piece assembly is rotatably disposed within the sealed isolator cap. A stem connects the pole piece assembly to the ball valve so that the ball valve rotates with the pole piece assembly. An armature cage is disposed over the isolator cap. Means, such as an electric motor, are provided to rotate the armature cage relative to the isolator cap. As in the previous embodiment, the armature cage and pole piece assembly form a magnetic circuit. Thus, as the armature cage is rotated by the electric motor, the pole piece assembly likewise rotates within the isolator cap, thereby rotating the ball valve to control the fluid flow through the fluid valve.

It is one object of the present invention to provide sealed fluid flow control valve that can be condition responsive. It is a further object to provide such a valve that is capable of step-wise or continuously variable operation.

Still another object of the invention is to provide a flow control valve that is magnetically actuated. A further object is to provide such a valve assembly that is simple to assemble and repair yet capable of efficient fluid-tight operation. Other objects and benefits of the present invention will become apparent when the following written description and accompanying figures are considered.

DESCRIPTION OF THE PREFERRED EMBODIMENTS

Figure 1:
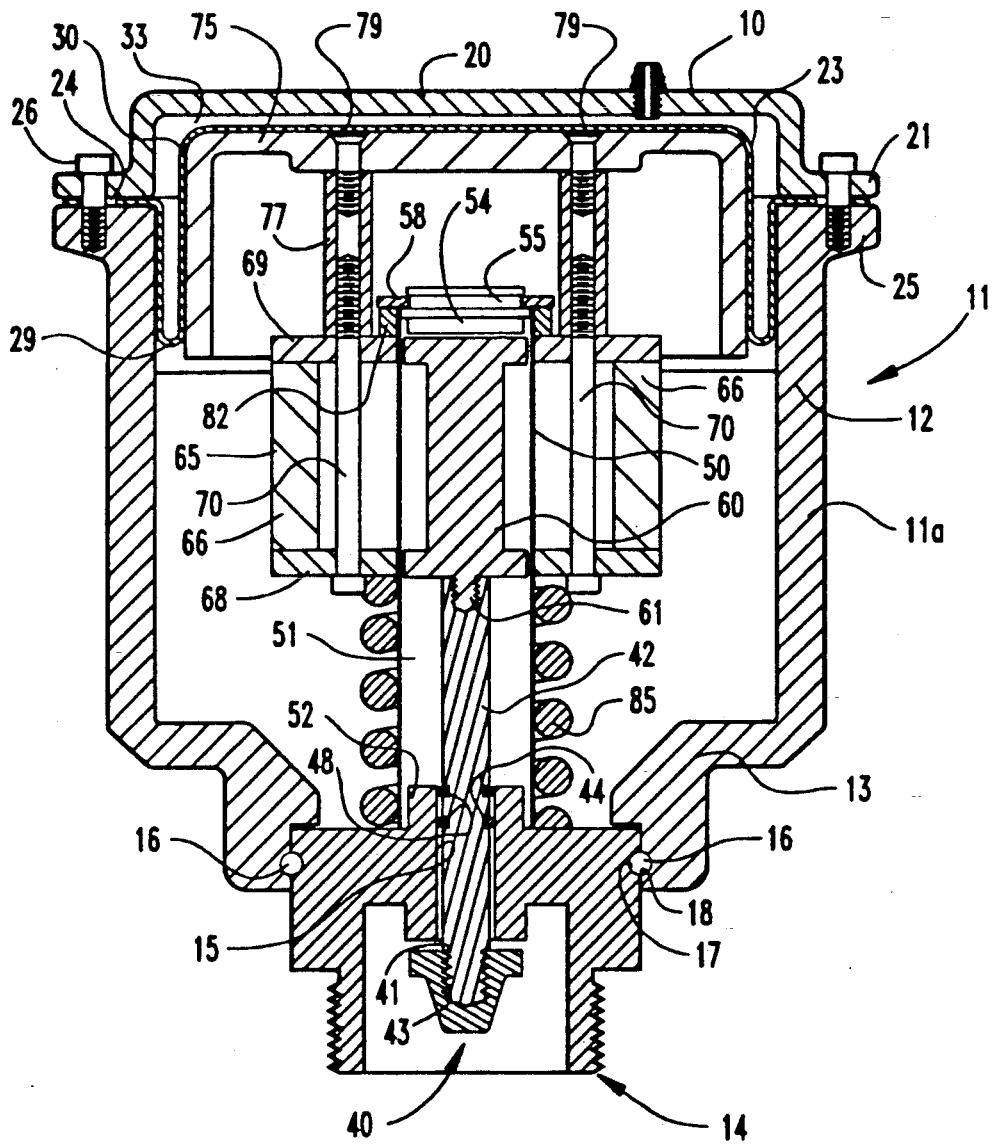
FIG. 1 is a side cross sectional view of one embodiment of a linearly actuated valve assembly according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In one embodiment of the present invention, shown in FIG. 1 a flow control valve assembly 10 includes a housing 11 consisting of an upper housing portion 12 and a lower housing portion 13. The upper and lower housing portions are joined by a pair of oppositely located arms 11a. As shown more clearly in FIG. 2, the upper and lower housing portions 12 and 13 are generally cylindrical in configuration. The arms 11a connecting the housing portions define a gap between the two portions through which the remaining components of the flow control valve assembly can be readily viewed and accessed.

An adaptor body 14 is connected to the lower housing portion 13. The adaptor body includes a threaded connection for engagement with a standard valve body, such as the valve body 90 shown in FIG. 3. The adaptor body 14 is connected to the lower housing portion 13 by way of a pair of roll pins 16 that are seated within a bore formed by a pair of pin channels. A first pair of pin channel 17 is formed in the outer circumference of the actuator body 14. A second pair of pin channels 18 is formed in the lower housing portion 13, preferably by drilling along a chord passing through the lower housing portion 13, as shown more clearly in FIG. 2. Since no fluid passes outside of the adaptor body 14 it is not essential that the connection between the adaptor body 14 and the housing 11 be fluid-tight.

The flow control valve assembly 10 further includes a cover 20 which is engaged at a flange 21 to a flange 25 at the upper housing portion 12. The cover is connected to the upper housing portion 12 by way of several self-tapping screws 26. Sandwiched between the cover 20 and the upper housing portion 12 is a diaphragm 23. The diaphragm 23 includes a number of mounting openings 24 through which the self-tapping screws 26 may pass when the cover is mounted on the housing.

Figure 2:
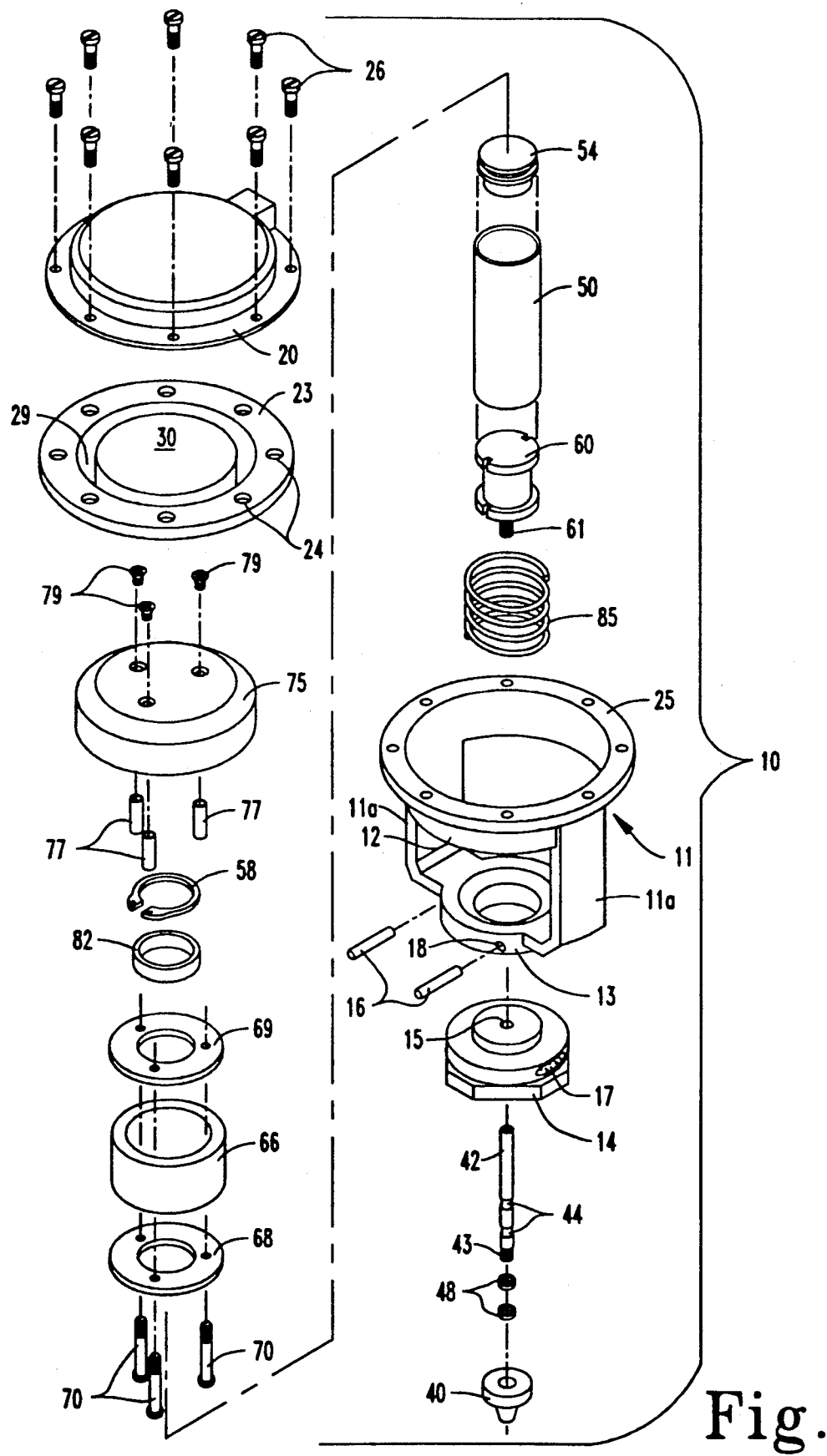
FIG. 2 is an exploded isometric view of the valve assembly of FIG. 1 shown in a disassembled configuration.

In the present embodiment, the diaphragm 23 includes a circumferential fold portion 29 and a preform portion 30 which assumes the shape of a cup, as shown in FIG. 2. In the preferred embodiment, the diaphragm is made of rubber so that it can be easily and repeatedly flexed. When the diaphragm is mounted between the housing 11 and the cover 20, a pressure cavity 33 is formed between the cover and the diaphragm surface. A pressure inlet 34, to which a fitting 35 is attached, opens into the pressure cavity 33. A separate pressure tube, such as tube 99 in FIG. 3, can be attached to the fitting 35 to provide a fluid under pressure to the cavity 33.

A principal component of the flow valve assembly 10 is the modulating plug 40 at the base of the assembly. The plug is internally threaded at 41 so that a threaded tip 43 of a stem 42 can be engaged therein. The stem slides axially within an actuation bore 15 through the adaptor body 14. The stem 42 includes a pair of ring grooves 44 which receive a pair of glide seals 48 therein. The glide seals can be composed of TEFLON ® or other similar bearing-type material which permits easy sliding of the stem 42 relative to the actuation bore 15 of the adaptor body 14. During normal operation, the glide seals 48 remain seated within the actuation bore 15 as the stem reciprocates through the bore. The glide seals may provide some fluid sealing, although the seals 48 are not necessarily provided for that purpose. The primary object of the glide seals 48 is to provide a wear surface for the reciprocating motion of the stem 42 and modulating plug 40. The glide rings can also be used to keep solids from entering the chamber. The glide seals 48 can be readily removed and replaced when they become worn.

In another aspect of the invention, an isolator cap 50 is mounted over a mounting boss 52 on the adaptor body 14. In the present embodiment, the isolator cap 50 is a non-magnetic stainless steel cylinder that can be silver soldered, welded or pressure fitted onto the mounting boss 52. Alternatively, the cap 50 can be composed of TEFLON ® a similar non-magnetic corrosion-resistant material. It is important that the connection between the isolator cap 50 and the mounting boss 52 be fluid-tight. A plug 54 is attached in fluid-tight engagement at the top end of the isolator cap 50 to form a chamber 51. In the preferred embodiment, the plug is also formed of stainless steel and is silver soldered to the isolator cap 50. The plug 54 includes a snap ring groove above the isolator cap 50 within which a retaining ring or snap ring 58 is engaged.

An armature spool 60 is disposed within the chamber 51 formed by the isolator cap 50 and plug 54. The lower end of the armature spool 60 includes a threaded post 61 which is engaged with an internally threaded upper end of the stem 42. The armature spool 60 and stem 42 are adapted to configured within the isolator cap 50. The armature spool 60 is composed of a ferro-magnetic material, such as 1018 low carbon steel. The stem 42 can be composed of stainless steel or another non-magnetic material.

Disposed around the isolator cap 50 is a pole piece assembly 65. In the present embodiment, the pole piece assembly 65 includes a ring magnet 66 that is bounded on its upper and lower faces by a lower pole piece 68 and an upper pole piece 69. The lower and upper pole pieces 68 and 69, respectively are held together by a number of assembly screws 70. The lower and upper pole pieces 68 and 69 are disc-shape while the magnet 66 is formed as an annular ring. Thus, the assembly screws 70 can be situated to contact the inner diameter of the magnet ring 66 to hold it in position relative to the isolator cap 50, rather than passing directly through the magnet. The lower and upper pole pieces 60 and 69 are composed of a magnetic material, such as 1018 low carbon steel. The ring magnet 66 is readily commercially available, such an Alnico 5 cylinder magnet sold as part no. 5G133 by Arnold Engineering Company.

The pole piece assembly 65 is adapted to reciprocate about the exterior of the isolator cap 50.

A diaphragm cup 75 is provided and is received within the preform portion 30 of the diaphragm 23. A number of stand-offs 77 are affixed to the underside of the diaphragm cup 75 by recessed screws 79, as shown in FIG. 1. The stand-offs 77 contact the upper pole piece 69 to push the pole piece assembly 65 down as the diaphragm cup 75 moves downward. A spacer 82 is situated between the upper pole piece 69 and the retaining snap ring 58 to prevent the pole piece assembly 65 from moving beyond the end of the isolator cap 50. A biasing spring 85 is disposed between the lower pole piece 68 and the adaptor body 14 to bias the pole piece assembly 65 upward toward the top of the isolator cap 50 when no pressure is applied to the diaphragm.

In the operation of the fluid control valve assembly 10 of the present invention, the pole piece assembly 65 and the armature spool 60 provide a continuous magnetic circuit. The magnetic flux generated by the ring magnet 66 follows the upper and lower pole pieces 68 and is closed by the magnetic material armature spool 60. Thus, as the pole piece assembly 65 reciprocates outside the isolator cap 50, the armature spool 60 is naturally drawn to move with the pole piece assembly 65 in order to maintain the continuity of the magnetic circuit. In this embodiment, the pole piece assembly 65 is the prime mover; that is, the armature spool 60 moves in response to motion of the pole piece assembly 65. As the armature spool 60 moves, the stem 42 and modulating plug 40 also move.

The diaphragm 23 provides the primary motive force for moving the pole piece assembly 65 downward relative to the isolator cap 50. As pressure P (FIG. 3) is applied through the pressure inlet 34 into the cavity 33, the diaphragm 23, and particularly the preform portion 30, flexes downward along the circumferential fold 29. AS the diaphragm 23 deflects it pushes the diaphragm cup 75 downward. The standoffs 77, connected to the cup 75 push against the upper pole piece 69 of the pole piece assembly 65. The force due to the pressure P acting against the diaphragm and moving the pole piece assembly 65 downward reacts against the spring force of the biasing spring 85 to compress the spring 85. In addition, as the pole piece assembly 65 moves downward, the armature spool 60 follows thereby moving the modulating plug 40 downward into a valve body, such as valve body 90 shown in FIG. 3. When the pressure P in the cavity 33 is reduced, the biasing spring 85 pushes the pole piece assembly 65 and diaphragm cup 75 upward until the spacer 82 contacts the retaining snap ring 58 at the top of the isolator cap 50. The travel of the pole piece assembly 65 is limited by the snap ring 58 at the top of the isolator cap and by the lower housing portion 13 at the bottom end of the isolator cap.

In one specific embodiment, the biasing spring 85 has a spring constant of 90 lb./in. The diaphragm 23 has a working area of about 7 in.[2] so that a closing pressure in cavity 33 of about 8 p.s.i. will produce an armature travel of about 0.5 in. The magnet 66 in this specific embodiment has an outer diameter of 2 in., an inner diameter of 1.5 in. and a height of 1 in. and provides a force of 625 oersted. The cap 50 has a thickness wall of 0.030 in. so the gap between the pole pieces and armature is minimal to reduce flux losses.

Figure 3:
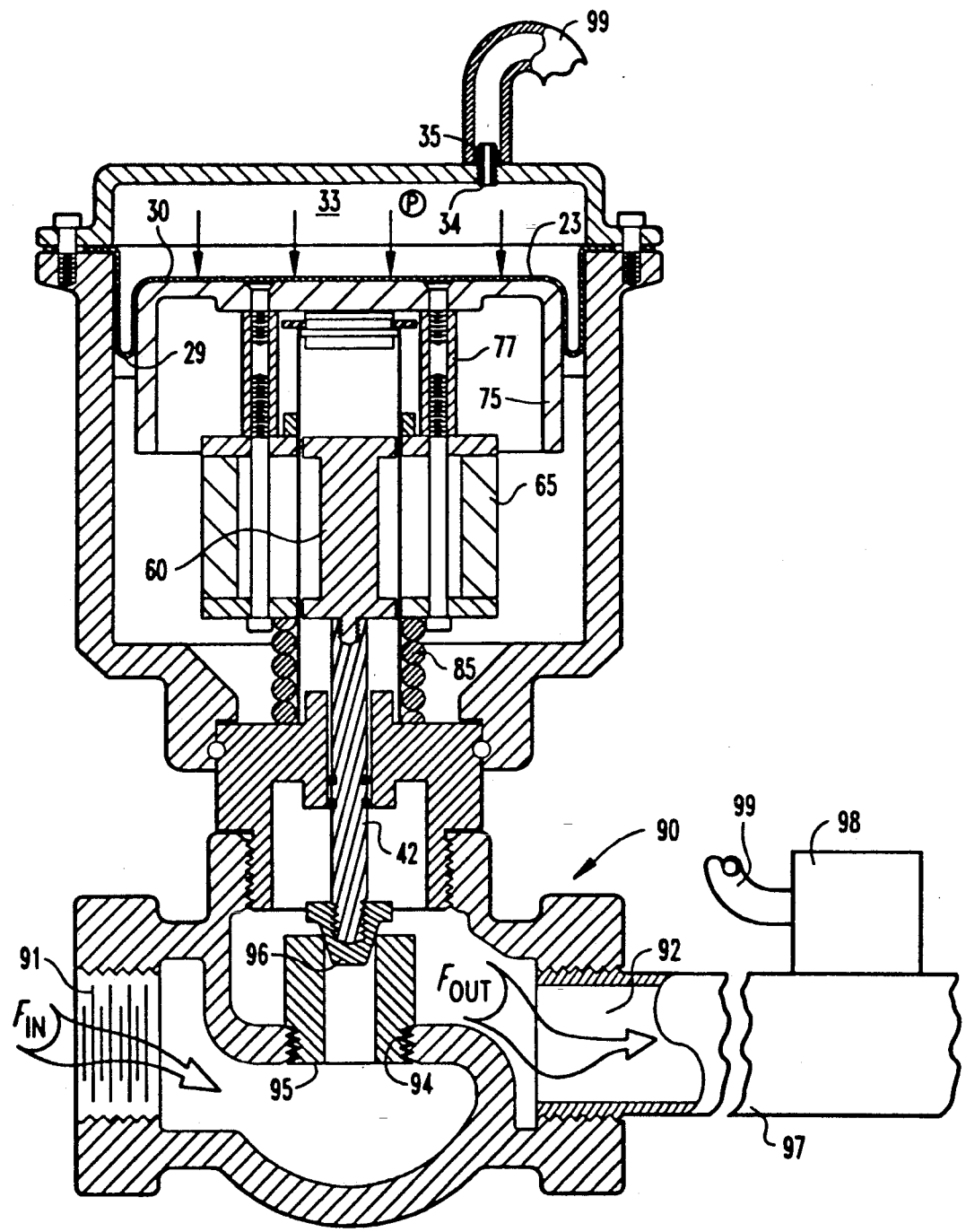
FIG. 3 is a side cross sectional view of the valve assembly of FIG. 1 used in connection with a valve body and fluid conduit.

One application of the flow control valve assembly 10 of the present invention is shown in FIG. 3. In this application, the valve assembly 10 is mounted to a valve body 90. The valve body 90 includes an inlet 91 and an outlet 92 with a flow control orifice 94 providing fluid communication between the inlet $F_{in}$ and the outlet $F_{out}$. An adaptor 95, having a bore 96 therethrough, is threaded into the flow control orifice 94 to minimize the armature stroke necessary to close the bore. In the present embodiment, the modulating plug 40 has a tapered configuration so that the amount of restriction of flow through the bore 96 is variable.

The outlet 92 of the valve body 90 is connected to a conduit 97. Downstream of the flow control valve assembly 10 in the conduit 97 is a sensor 98. The sensor 98 can sense some condition of the fluid passing through the conduit 97. For instance, the sensor may determine the flow rate, the pressure or the fluid temperature. The sensor includes a pneumatic or hydraulic actuator which discharges a fluid under pressure through the pressure tube 99. The pressure tube 99 is connected to the fitting 95 to provide fluid pressure through the pressure inlet 34 into the cavity 33. Thus, in this application, the sensor 98 senses a particular condition of the fluid passing through the conduit 97 and varies the pressure in the pressure cavity 33 by way of a fluid through the pressure tube 99. A constant adjustment of the fluid $F_{out}$ flowing through the bore 96 and outlet 92 can then be achieved by modulating the pressure operating against the diaphragm 23 in response to the sensed condition.

The present invention provides a device for controlling fluid flow through a valve body in response to a sensed condition. The flow control valve assembly 10 provides a leak-proof configuration in which the actuator (armature 60 and stem 42) reciprocates within a completely sealed cavity, such as chamber 51 within isolator cap 50. Any fluid that leaks past the glide seals 48 in trapped within chamber 51. The use of the pole piece assembly 65 and the magnetically coupled armature spool 60 permits actuation where there is no physical connection between the prime-mover and the actuated stem 42 and modulating plug 40.

Figure 4:
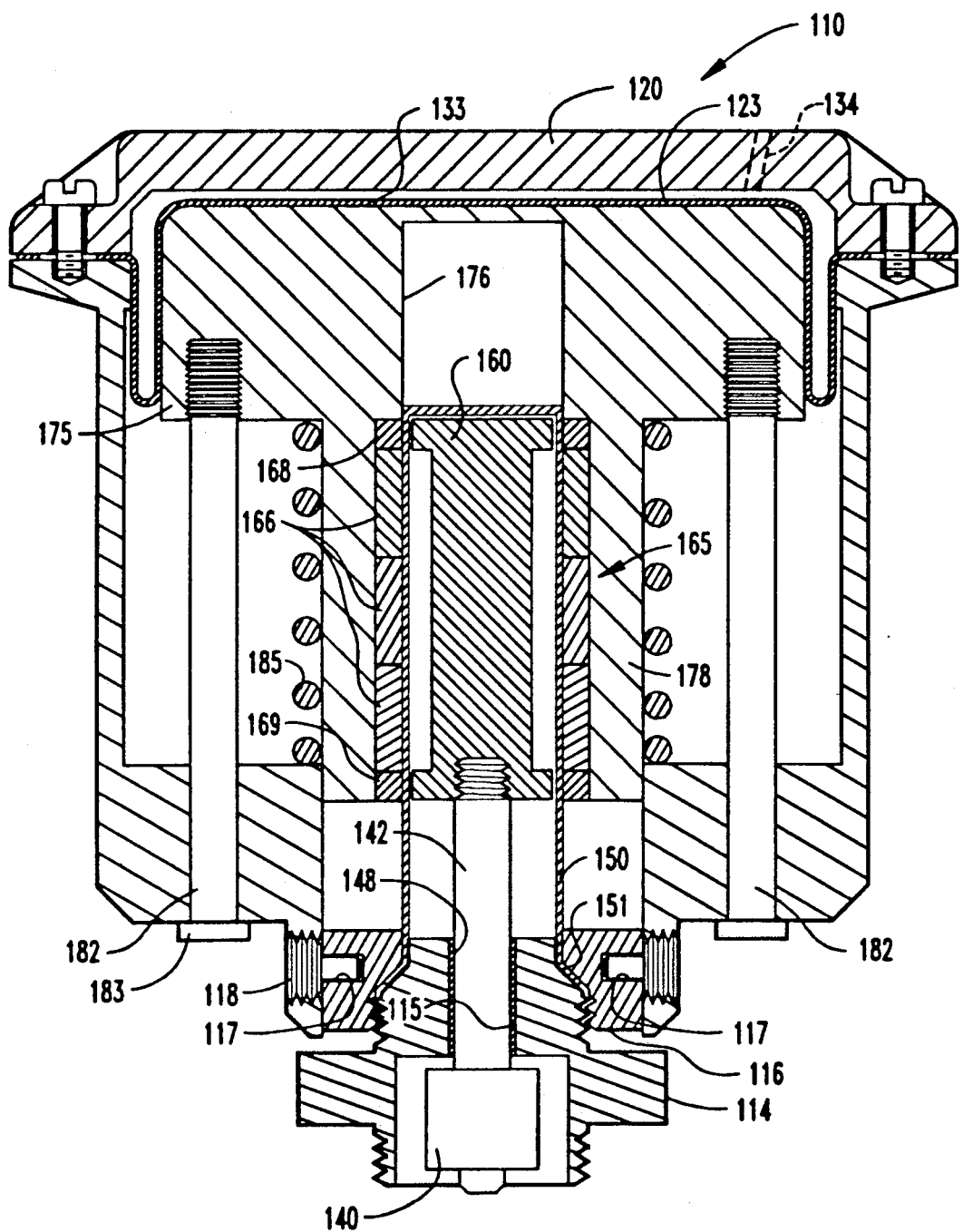
FIG. 4 is a side cross sectional view of a second embodiment of a linearly actuated valve assembly of the present invention.

In a second embodiment of the invention, shown in FIG. 4, a flow control valve assembly 110 is provided which is similiar in function and operation to the flow control valve 10 of the previous embodiment. The valve assembly 110 includes a housing 111 which can have an open configuration similiar to the previous housing 11. In a variation from the first embodiment, the flow control valve assembly 110 includes a compression nut 116. The compression nut 116 is connected to the housing 111 by way of a number of set screws 118 engaged in bores 117 in the compression nut. The valve assembly 110 further includes a cover 120 and a diaphragm 123 that is similar to the cover and diaphragm of the previous embodiment. A pressure cavity 133 is defined between the diaphragm and the cover and is fed by a pressure inlet 134 through the cover 120.

The flow control valve assembly 110 includes a compression adaptor 114 which is threaded at its bottom end for connection to a flow valve as with the former embodiment. The compression adaptor 114 includes a bore 115 through which a stem 142 is reciprocated. A bushing 148 can be mounted within the bore 115 to reduce the sliding friction between the stem and the compression adaptor 114. A modulating plug 140 is affixed at the end of a stem 142.

The flow control valve assembly 110 includes an isolator cap 150 in the shape of a closed-end cylinder. Opposite the closed end is a flared portion 151. The flared portion 151 is engaged between similarly configured portions of the compression adaptor 114 and compression nut 116. The compression adaptor 114 can be threaded into the nut 116 thereby exerting pressure against the flared portion 151 to retain the isolator cap in a fluid-tight arrangement.

As in the previous embodiment, an armature spool 160 is connected to the end of the stem 142 and reciprocates within the isolator cap 150. In this embodiment, however, the end of the cap is closed thereby providing the upper limit to the motion of the armature spool 160, stem 142 and, consequently, the modulating plug 140. The pole piece assembly 165 includes a number of magnetic rings 166 which are engaged between a lower pole piece 168 and an upper pole piece 169. The pole piece assembly 165 is mounted within a collar 178 of a diaphragm cup 175. The diaphragm cup 175 is engaged within the diaphragm 123. The diaphragm cup 175 includes a cylindrical cavity 176 which permits the diaphragm cup 175 to reciprocate over the outside of the isolator cap 150.

The diaphragm cup 175 includes a collar 178 to which the pole piece assembly 165 is affixed. A number of guide rods 182 pass through the lower portion of the housing 111 and are engaged, preferably by threads, to the underside of the diaphragm cup 175. The ends of the guide rods 182 are formed into stops 183 which react against the outside of the housing 111 to prevent further upward motion of the diaphragm cup 175. A biasing spring 185, similar to the spring 85 previously described, is provided to bias the pole piece assembly and diaphragm cup to an upward, normally open position.

The collar 178 of the diaphragm cup 175 reciprocates within a bore 172 in the lower part of the housing 112. The travel of the diaphragm cup and collar 178 is limited at the bottom of their stroke by the compression nut 116. The flow control valve assembly 110 operates and functions in a manner nearly identical to the valve assembly 10 of the previous embodiment.

Figure 5:
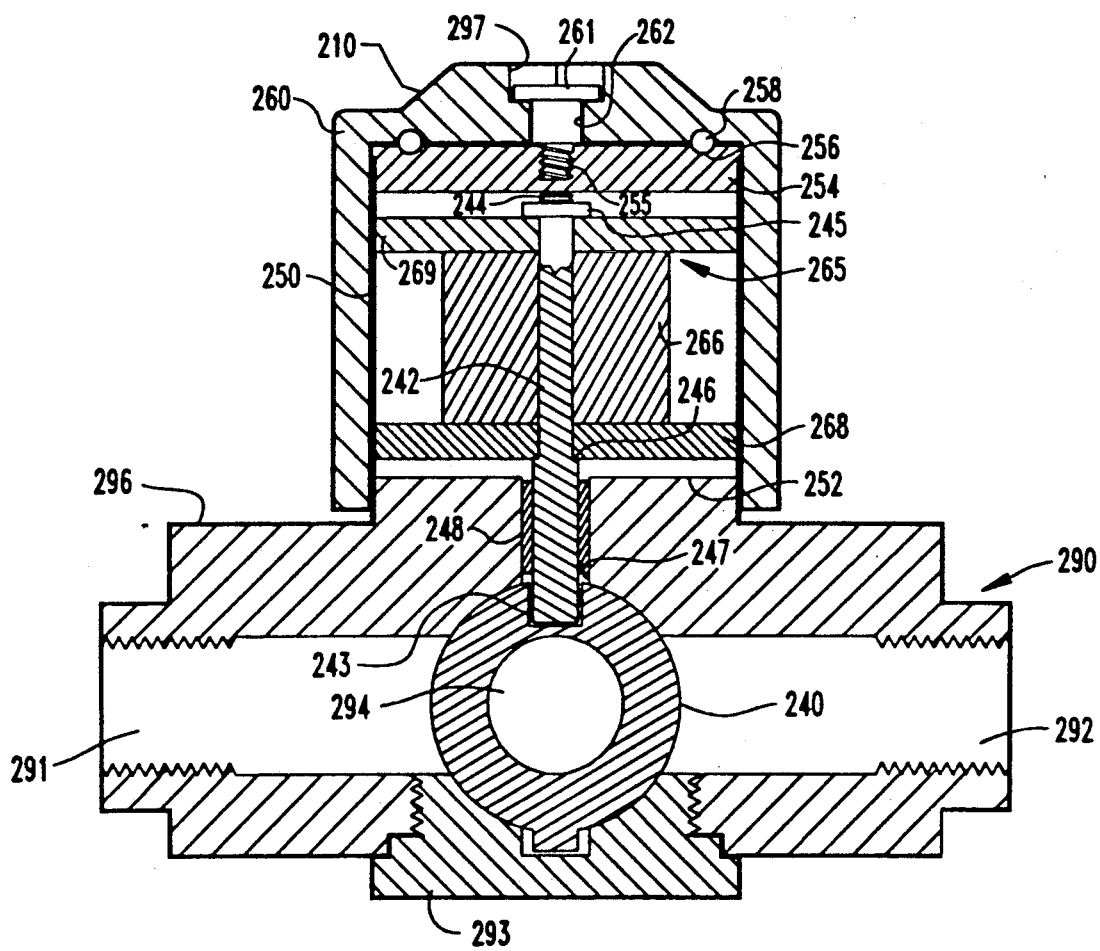
FIG. 5 is a side cross sectional view of one embodiment of a rotary actuated valve assembly according to the present invention.
Figure 6:
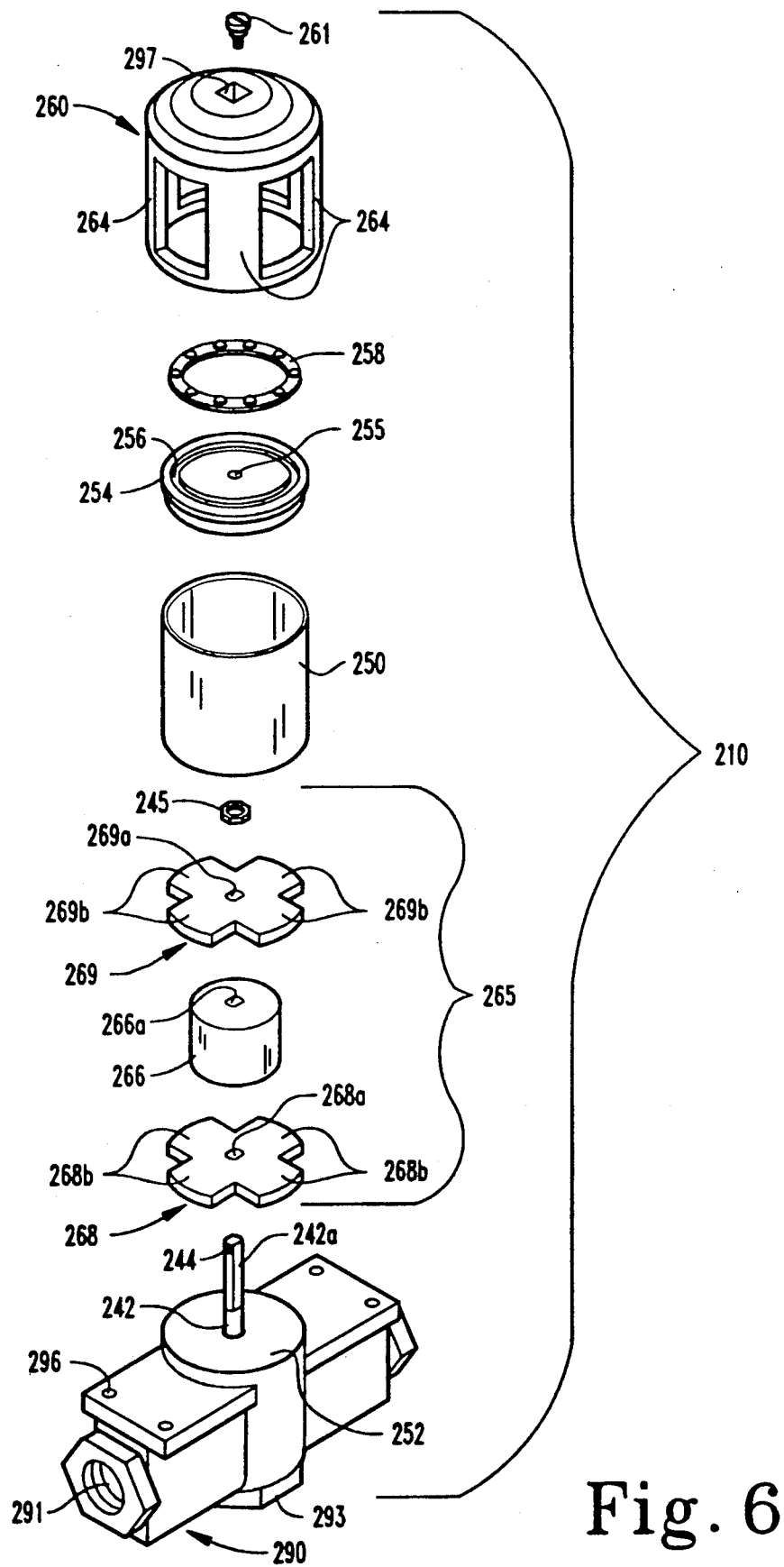
FIG. 6 is an exploded isometric view of the valve assembly of FIG. 5 shown in a disassembled configuration.

In another embodiment of the invention, illustrated in FIGS. 5 and 6, a rotary actuated valve assembly 210 is provided. The valve assembly 210 is shown mounted on a conventional valve body 290 which includes a ball valve 240. The ball valve 240 includes a flow control orifice 294 which connects the inlet 291 and the outlet 292 of the valve body 290. An access plug 293 is threaded into the base of the valve body 290 to permit assembly of the ball valve within the body. Flow through the valve body 290 is controlled by rotating the ball valve 240 within the body to increase or decrease the portion of the flow control orifice 294 open between the inlet and outlet.

Actuation of the ball valve 240 is accomplished through a stem 242 which is engaged at end 243 to the ball valve, preferably as a threaded engagement. The stem 242 rotates within a bushing 248 mounted in an actuation bore 247 in the valve body 290. The bushing 248 is preferably composed of a resin, such as a polytetrafluoroethylene (TEFLON ®) for instance), although other materials, such as bronze, may be used depending upon the application for the rotary valve assembly 210. The stem 242 is preferably composed of a non-magnetic corrosion-resistant material, such as stainless steel.

A pole piece assembly 265 is axially disposed along the stem 242. The pole piece assembly 265 includes a cylindrical magnet 266 sandwiched between a lower pole piece 268 and an upper pole piece 269. The stem 242 includes a keyed portion 242a which fits through correspondingly shaped keyed bores 266a, 268a and 269a in the magnet, lower pole piece and upper pole piece, respectively. The keyed relationship between the stem portion 242a and the bores 266a, 268a and 269a allows the stem and pole piece assembly to rotate as a unit. In the preferred embodiment, the pole pieces are composed of a magnetic material, such as 1018 low carbon steel, while the magnet 266 is a cast Alnico 8 magnet from Arnold Engineering.

The stem 242 includes a shoulder 246 formed at the base of the keyed portion 242a which supports the lower pole piece 268 and, consequently, the entire pole piece assembly 265. The shoulder 246 is displaced slightly above the surface of the valve body to avoid frictional contact between the lower pole piece 268 and the body 290. The pole piece assembly is held in position on the stem by a nut 245 threaded onto a threaded tip 244 of the stem.

An isolator cap 250 surrounds the pole piece assembly 265 and stem 242. The cap 250 comprises a non-magnetic stainless steel cylinder which is suitably sealingly affixed to a mounting boss 252 of the valve body 290. The open top of the cap cylinder 250 is closed by a non-magnetic plug 254 which is sealingly engaged to the cap, such as by brazing or welding. The engagement between the cap 250 and the mounting boss 252 and plug 254 provides a leak-proof seal for the interior of the cap. Thus, any fluid leakage from the valve body 290 through the actuation bore 247 and into the cap 250 is completely contained within the cap.

While the pole piece assembly (65 and 165) of the linear actuated valve assemblies (10 and 110) are the prime movers, the pole piece assembly 265 of the rotary actuated valve assembly 210 operates as a follower. In this embodiment, the armature cage 260 is the prime mover—that is, the pole piece assembly 265 follows the movement of the armature cage 260. The armature cage 260 surrounds the isolator cap 250 and rides upon a ball bearing assembly 258 supported in a bearing track 256 at the top surface of the plug 254. A shoulder bolt 261 passes through a bearing bore 262 in the armature cage 260 and is threaded into a bore 255 in the plug 254. The shoulder bolt 261 retains the armature cage 260 over the isolator cap 250 and provides a bearing surface for smooth rotation of the cage 260 relative to the cap 250.

In the preferred embodiment, the armature cage 250 includes a keyed coupling bore 297 to be drivenly engaged to a prime mover (not shown). The valve body 290 includes a mounting surface 296 on which the prime mover may be mounted. In the preferred embodiment, the prime mover is an electric gear motor which, in essence, replaces the pressure diaphragm arrangement of the linearly actuated embodiments. The motor can be connected to a sensor/controller, such as the sensor 198 depicted downstream of the valve body in FIG. 2.

The armature cage 260 includes evenly spaced apart vertically oriented legs 264. The lower and upper pole pieces 268 and 269 each include correspondingly located pole arms 268b and 269b, respectively. The armature legs 264 and pole arms 268b and 269b define a magnetic circuit for the magnetic flux generated by the magnet 266. The gaps between the armature legs 264 tend to concentrate the magnetic field in the legs 264 and arms 268b and 269b. As the armature cage 260 rotates the pole piece assembly 265 has a tendency to rotate with the cage in order to maintain the flux path established between the legs 264 and the arms 268b and 269b. As the pole piece assembly rotates, so does the stem 242 and the ball valve 240 to which the stem is attached, thereby effecting controlled opening and closing of the flow control orifice 294.

Figure 7:
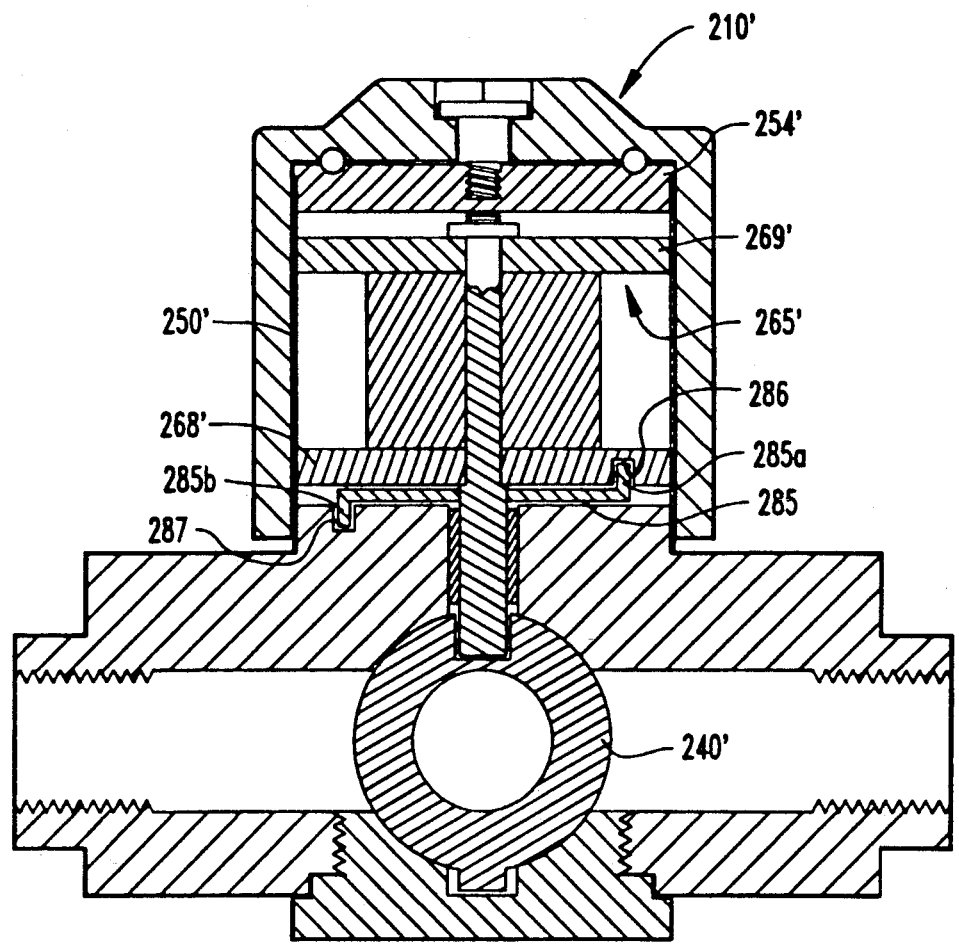

In an alternative version of the present embodiment, shown in FIG. 7, a rotary valve assembly 210', which is substantially similar to the assembly 210, includes a torsion spring 285 to bias the pole piece assembly 265' and, consequently, the ball valve 240' to a particular orientation. The torsion spring 285 includes ends 285a and 285b which fit into connection holes 286 and 287 in the lower pole piece 268' and mounting boss 252', respectively. Alternatively, the spring can be disposed between the plug 254' at the top of the isolator cap 250' and the upper pole piece 269'. The torsion spring 285 can be calibrated and positioned so that in its free state the spring biases the ball valve 240' to a closed position, for example.

The flow control valve assemblies 10, 110 and 210 of the present invention can have many applications. The assemblies can be used to provide fluid control of water or corrosive chemicals, for instance, in an industrial process. A primary benefit of the present invention is that the valve assembly is positively sealed against leakage of the fluid to be monitored and/or controlled. The valve assemblies of the present invention can operate simply as an on-off valve, but are best suited for applications requiring step-wise or continuously variable operation between an on and an off position. The present invention can also be adapted to control a three-way mixing valve. The rotary actuated embodiment is particularly well-suited for the three-way valve application by simply substituting a three-way valve element and valve body for the illustrated ball valve.

The characteristics of the specific elements of the magnetic circuit formed by the armature and pole piece assemblies of the several embodiments are determined largely by the application to which the devices are put. For instance, the strength of the magnets 66, 166 and 266 must be sufficient to overcome the biasing springs 85, 185 and 285 as well as the pressure of the fluid passing through the valve body and the friction inherent with the motion of the stem. The force to break the magnetic bond between the armature and pole piece assembly must also be calibrated to the particular application to avoid decoupling between the working members of the device.

While the invention has been illustrated and described in detail in the drawings and foregoing description, the same is to be considered as illustrative and not restrictive in character. It is understood that only the preferred embodiments have been shown and described and that all changes and modifications that come within the spirit of the invention are desired to be protected.

For instance, while permanent magnets have been described electro-magnets may be substituted in appropriate applications of this invention. In another variation, the sensor 98 may be an electrical sensor, such as a transducer, that converts a sensed condition of the fluid into an electrical signal for use by a motor or an electrical controller.

With respect to the rotary actuated embodiment of FIGS. 5 and 6, it is contemplated that the ball valve of valve body 290 is replaced with another suitable rotary-type valve that is capable of continuously varying the fluid flow through the valve. In addition, while the torsion spring 285 is shown engaging the pole piece assembly, it is also contemplated that the spring be disposed between the armature cage 250 and the prime mover. In either instance, the prime mover can be decoupled, either externally from the armature cage or internally by assuming a "free-wheeling" state.

What is claimed is:

1. A sealed magnetic control valve assembly for use in connection with a fluid valve controlling flow through a conduit, the fluid valve having an inlet, an outlet and a flow control orifice hydraulically disposed therebetween, the valve assembly comprising:
   a sealed cylindrical isolator cap, composed of non-magnetic material, having a longitudinal length and defining a chamber open at one end;
   means for sealingly mounting said isolator cap at said one end to the fluid valve such that said chamber is in fluid communication with the fluid valve;
   an armature composed of a magnetic material and reciprocatably disposed within said chamber of said isolator cap; and
   a modulating plug connected to said armature to extend outside said chamber through said one end and into the fluid valve adjacent the flow control orifice when said isolator cap is mounted to the fluid valve, whereby modulation of said modulating plug within the flow control orifice controls the flow of fluid through the outlet of the fluid valve;
   a pole piece assembly reciprocatably disposed outside and adjacent to said isolator cap and including;
      a pair of opposite pole pieces composed of a magnetic material; and
      a magnet disposed between said opposite pole pieces; means for moving said pole piece assembly along the longitudinal length of said isolator cap.
   wherein said armature has a pair of opposite ends with a length substantially equal to the distance between said pair of opposite pole pieces;
   whereby said armature and said pole piece assembly define a magnetic circuit so that when said pole piece assembly is moved along the longitudinal length of said isolator cap, by said means for moving, said armature moves within said isolator cap in direct relation thereto to maintain the magnetic circuit, such that said pair of opposite ends and said pair of opposite pole pieces are in direct alignment with each other in all positions of said modulating plug; and
   further whereby said modulating plug moves with said armature to vary fluid flow through the flow control orifice and the outlet of the fluid valve in relation to the movement of said modulating plug relative to the flow control orifice.

2. The control valve assembly of claim 1, wherein said means for moving includes:
   a diaphragm;
   means for defining a cavity including said diaphragm;
   means for providing a pressurizing fluid under pressure to said cavity to flex said diaphragm in a first direction; and
   means for connecting said diaphragm to said pole piece assembly.

3. The control valve assembly of claim 2, wherein said means for providing a pressurizing fluid includes:
   means for sensing a condition of fluid flowing through the conduit; and
   means for varying the pressure of the pressurizing fluid provided to said cavity in response to the sensed condition of the fluid flowing through the conduit.

4. The control valve assembly of claim 2, wherein said means for moving further includes means for biasing said pole piece assembly against reciprocation in a first direction.

5. The control valve assembly of claim 4, wherein:
said means for biasing includes a spring operable to push said pole piece assembly in a second direction opposite said first direction; and
said control valve assembly further includes a retaining ring engaged about said isolator cap at the end opposite said open end for preventing motion of said pole piece assembly in said second direction past said retaining ring.

6. The control valve assembly of claim 1, wherein said magnet is a permanent magnet.

7. The control valve assembly of claim 1, wherein said means for sealingly mounting includes:
an adapter body having a mounting boss and an actuation bore therethrough;
wherein said isolator cap is removably sealingly engaged into said mounting boss; and
further wherein said modulating plug extends through said actuation bore.

8. The control valve assembly of claim 7, further comprising:
a stem engaged at one end to said armature and at the other end to said modulating plug, and extending along the longitudinal length of said isolator cap and through said actuation bore; and
a number of glide seals disposed between said stem and said actuation bore.

9. The control valve assembly of claim 1, wherein said means for sealingly mounting includes:
said isolator cap having a flared portion at said open end;
a compression adaptor having means for engaging the fluid valve;
a compression nut having means for engaging said compression adaptor with said flared portion of said isolator cap sealingly engaged between said adaptor and said nut.

10. A sealed magnetic control valve assembly for use in connection with a rotary fluid valve controlling flow through a conduit, the fluid valve having an inlet, an outlet and a ball valve interposed therebetween in which the ball valve is rotatable within the fluid valve to control the fluid flowing therethrough, the valve assembly comprising:
a sealed cylindrical isolator cap, composed of non-magnetic material, having a longitudinal length and defining a chamber open at one end;
means for sealingly mounting said isolator cap at said one end to the fluid valve such that said chamber is in fluid communication with the fluid valve;
a pole piece assembly rotatably disposed within said isolator cap and including;
a pair of opposite pole pieces compsed of a magnetic material and having a plurality of pole arms; and
a magnet disposed between said opposite pole pieces;
means for connecting said pole piece assembly to the ball valve so that the ball valve is rotatable with said pole piece assembly;
an armature cage composed of a magnetic material and having a plurality of spaced apart legs corresponding to said plurality of pole arms with a length substantially equal to the distance between said pair of opposite pole pieces, and rotatably disposed outside and adjacent to said isolator cap; and
means for rotating said armature cage relative to said isolator cap;
whereby said armature cage and said pole piece assembly define a magnetic circuit so that when said armature cage is rotated outside said pole piece assembly rotates in direct relation thereto to maintain the magnetic circuit, such that said plurality of legs and said plurality of pole arms are in direct alignment with each other in all positions of said ball valve; and
further whereby the rotation of said pole piece assembly causes the ball valve to rotate to vary the flow of fluid through the outlet of the fluid valve in relation to the movement of said ball valve.

11. The control valve assembly of claim 10, further comprising means for rotationally mounting said armature cage over said isolator cap including:
a closed end of said isolator cap;
an inner surface of said armature cage disposed adjacent said closed end of said isolator cap; and
bearing means between said closed end of said isolator cap and said inner surface of said armature.

12. The control valve assembly of claim 10, wherein:
each of said opposite pole pieces is a disc having a keyed opening therethrough;
said magnet is a cylindrical magnet having a keyed bore therethrough; and
said means for connecting said pole piece assembly to the ball valve includes;
a stem having a keyed portion extending through and interengaged with said keyed opening in each of said pole pieces and said keyed bore;
means at one end of said stem for connecting said stem to the ball valve; and
means at the other end of said stem for retaining said stem in interlocking engagement with said pole piece assembly.

13. The control valve assembly of claim 10, further including a torsion spring operably disposed between said isolator cap and said pole piece assembly for biasing said pole piece assembly to a predetermined orientation relative to said isolator cap.

14. A sealed magnetic control valve assembly for use in connection with a fluid valve controlling flow through a conduit, the fluid valve having an inlet, an outlet and a flow control orifice hydraulically disposed therebetween, the valve assembly comprising:
a sealed cylindrical isolator cap defining a chamber open at one end and composed of a non-magnetic material;
means for sealingly mounting said isolator cap at said one end to the fluid valve such that said chamber is in fluid communication with the fluid valve;
a modulating plug;
an armature composed of a magnetic material and movable relative to said isolator cap; and
a pole piece assembly movable relative to said isolator cap and including;
a pair of opposite pole pieces composed of a magnetic material; and
a magnet disposed between said opposite pole pieces;

means for moving one of said armature and said pole piece assembly relative to said isolator cap.

wherein said armature has a pair of opposite ends with a length substantially equal to the distance between said pair of opposite pole pieces;

wherein said one of said armature and said pole piece assembly is disposed outside said isolator cap, and the other of said armature and said pole piece assembly is disposed within said chamber defined by said isolator cap and is connected to said modulating plug;

whereby said armature and said pole piece assembly define a magnetic circuit so that when said one of said armature and said pole piece assembly is moved by said means for moving, said other of said armature and said pole piece assembly moves in direct response thereto, such that said pair of opposite ends and said pair of opposite pole pieces are in direct alignment with each other in all positions of said modulating plug; and further whereby said modulating plug moves with said other of said armature and said pole piece assembly to vary the flow of a fluid through the flow control orifice and the outlet of the fluid valve in proportion to the amount of movement of said modulating plug relative to the flow control orifice.

* * * * *